UNITED STATES PATENT OFFICE.

GEORGE G. OBERFELL AND HUGH T. BOYD, OF HOMER, OHIO, ASSIGNORS TO THE OHIO FUEL SUPPLY COMPANY, OF PITTSBURGH, PENNSYLVANIA, A CORPORATION OF OHIO.

SEPARATION OF AMYLACETATE FROM CHLOR-HYDROCARBONS.

1,278,198.  Specification of Letters Patent.  Patented Sept. 10, 1918.

No Drawing.  Application filed January 22, 1918.  Serial No. 213,230.

*To all whom it may concern:*

Be it known that we, GEORGE G. OBERFELL and HUGH T. BOYD, citizens of the United States, and residents of Homer, Ohio, have invented certain new and useful Improvements in Separation of Amylacetate from Chlor-Hydrocarbons, of which the following is a specification.

This invention relates to improvements in the separation of synthetic amyl acetate or its homologues or synthetic fusel oil or its homologues from chlor-hydrocarbons.

It is known, see Worden, "*The Nitro-Cellulose Industry*," or N. Chercheffsky, *Matieres Grasses*—6—3103—10, this article being abstracted in *Chemical Abstracts of 1913*, volume 7, pages 3022 and 3023, that amyl acetate and its homologues are soluble in cold sulfuric acid.

Due to the relative insolubility of the chlor-compounds of the paraffin hydrocarbons in sulfuric acid it is possible by this method, which depends on the solubility of amyl acetate and its homologues and the relative insolubility of the chlor-compounds of the paraffin hydrocarbons in sulfuric acid, to separate mixtures consisting of amyl acetate and its homologues, saturated paraffin hydrocarbons, chlor-compounds, paraffin hydrocarbons, and poly-methylene hydrocarbons into two layers, one consisting of acetates and olefin hydrocarbons dissolved in sulfuric acid, the other consisting of the chlor-compounds, polymethylene hydrocarbons or naphthenes and saturated paraffin hydrocarbons, and hereinafter referred to as the supernatant layer.

Now we have found that by drawing off the supernatant layer, the sulfuric acid acetate solution can be made to give up its dissolved acetates by either dilution with water or wet steam distillation, that by this method a yield of at least 90% of the total acetates present can be recovered containing practically none of the aforementioned impurities.

If the mixture contains members of the olefin series such as are formed in the decomposition of chlor-pentane with alkali acetate in the presence of acetic acid, (see *Schorlemmer-Liebigs Annalen* p. 268, or Kaufler U. S. Patent No. 1,106,047), these can be first removed by fractional distillation, (see Masland U. S. Patent No. 1,086,381), and the method applied to the residue.

We claim:

1. A method of separating amyl acetate and its homologues from chlor-compounds, polymethylene compounds, paraffin hydrocarbons, etc., which consists in dissolving the amyl acetate or its homologues in sulfuric acid and then removing the compounds unacted on by the sulfuric acid.

2. A method of purifying synthetic amyl acetate and its homologues prepared by the esterification of the chlor-hydrocarbons of the paraffin series which consists in first fractionally distilling the esterified product to separate the unsaturated hydrocarbons of the olefin series formed in the reaction and subsequently treating the residue formed in the decomposition of the chlor-compounds during esterification with sulfuric acid which dissolves the amyl acetate and its homologues and leaves unaffected the other constituents.

3. A method of purifying synthetic amyl acetate and its homologues prepared by the esterification of the chlorhydrocarbons of the paraffin olefin or naphthene series which consists in first fractionally distilling the esterified product thereby separating the unsaturated hydrocarbons of the olefin series formed in the reaction, subsequently treating the residue formed by the decomposition of the chlor-compounds during esterification with sulfuric acid which takes into solution the amyl acetate and its homologues, leaving unaffected the other constituents and after separation of the two layers, then treating the sulfuric acid and amyl acetate solution to separate from the solution the amyl acetate or its homologues.

In testimony whereof, we affix our signatures.

GEORGE G. OBERFELL.
HUGH T. BOYD.